(12) United States Patent
Kobayashi

(10) Patent No.: US 9,110,859 B2
(45) Date of Patent: Aug. 18, 2015

(54) SIGNAL PROCESSING DEVICE AND SIGNAL PROCESSING METHOD

(71) Applicant: FUJITSU LIMITED, Kawasaki-shi, Kanagawa (JP)

(72) Inventor: Noboru Kobayashi, Tokorozawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/282,783

(22) Filed: May 20, 2014

(65) Prior Publication Data

US 2014/0317321 A1 Oct. 23, 2014

Related U.S. Application Data

(63) Continuation of application No. PCT/JP2011/077427, filed on Nov. 28, 2011.

(51) Int. Cl.
*G06F 13/16* (2006.01)
*G06F 9/38* (2006.01)
*G06F 13/28* (2006.01)
*G06F 9/46* (2006.01)

(52) U.S. Cl.
CPC .......... *G06F 13/1689* (2013.01); *G06F 9/3836* (2013.01); *G06F 9/3853* (2013.01); *G06F 9/46* (2013.01); *G06F 13/28* (2013.01)

(58) Field of Classification Search
None
See application file for complete search history.

(56) References Cited

U.S. PATENT DOCUMENTS

| 5,515,332 | A | * | 5/1996 | Pascucci et al. | 365/233.1 |
|---|---|---|---|---|---|
| 5,530,901 | A | * | 6/1996 | Nitta | 710/28 |
| 5,787,303 | A | * | 7/1998 | Ishikawa | 712/24 |
| 5,941,984 | A | * | 8/1999 | Mohri et al. | 712/218 |
| 6,892,293 | B2 | * | 5/2005 | Sachs et al. | 712/215 |
| 8,549,258 | B2 | * | 10/2013 | Lee et al. | 712/15 |
| 8,892,849 | B2 | * | 11/2014 | Hokenek et al. | 712/7 |
| 2002/0184471 | A1 | | 12/2002 | Hatae et al. | |
| 2005/0198546 | A1 | * | 9/2005 | Tani | 713/324 |
| 2008/0133888 | A1 | * | 6/2008 | Arakawa | 712/214 |
| 2009/0113179 | A1 | * | 4/2009 | Kakeda et al. | 712/205 |
| 2009/0210667 | A1 | * | 8/2009 | Luick | 712/215 |
| 2010/0005278 | A1 | * | 1/2010 | Tani | 712/220 |
| 2011/0296110 | A1 | * | 12/2011 | Lilly et al. | 711/118 |

FOREIGN PATENT DOCUMENTS

| EP | 0284364 A2 | 9/1988 |
|---|---|---|
| JP | 63-240664 | 10/1988 |
| JP | 2002-268876 | 9/2002 |
| JP | 2002-358288 | 12/2002 |

(Continued)

OTHER PUBLICATIONS

'Structured Computer Organization—Second Edition' by Andrew S. Tanenbaum, pp. 10-11, copyright 1984 by Prentice-Hall, Inc.*

(Continued)

*Primary Examiner* — Steven Snyder
(74) *Attorney, Agent, or Firm* — Fujitsu Patent Center

(57) ABSTRACT

A signal processing device includes an operation control unit configured to control a timing of an operation process executed by an operation unit; and a transfer control unit configured to control a timing of transferring data that is a target of the operation process, such that the data that is the target of the operation process is loaded by the operation unit according to the timing of the operation process controlled by the operation control unit.

12 Claims, 12 Drawing Sheets

(56) References Cited

FOREIGN PATENT DOCUMENTS

| JP | 2007-317152 | 12/2007 |
|----|-------------|---------|
| JP | 2011-141791 | 7/2011  |

OTHER PUBLICATIONS

'Introduction to Explicitly Parallel Instruction Computing (EPIC) and Very Long Instruction Word (VLIW) Architectures' by Bhagi Narahari, George Washington University, CS 211 notes, archived from Jun. 21, 2010.*

'Techniques for Extracting Instruction Level Parallelism on MIMD Architectures' by Gary Tyson and Matthew Farrens, 26th International Symposium on Microarchitecture, pp. 128-137, Dec. 1993.*

'Exploiting Thread-Level Parallelism on Simultaneous Multithreaded Processors' by Jack Lee-jay Lo, A dissertation submitted in partial fulfillment of the degree of Doctor of Philosophy, University of Washington, 1998.*

Atsuhiro Suga, "The Nuts and Bolts of Tuning for Multi-core Performance: Supercomputer Technology Is Applied to CE Processors", Nikkei Electornics,Sep. 12, 2005, No. 908, pp. 119-130 (partial English Translation).

Takamichi Miyamoto et al., "Parallelization of Multimedia Applications by Compiler on Multicores for Consumer Electronics", Symposium on Advanced Computing Systems and Infrastructures, SACSIS2008 Ronbunshu, Jun. 2008, vol. 2008, pp. 403 to 410 (English abstract).

International Search Report of Int. Appl. No. PCT/JP2011/077427 dated Feb. 28, 2012.

JOPA—Office Action mailed on Mar. 3, 2015 issued with respect to the corresponding Japanese Patent Application No. 2013-546871 with partial English translation.

James E. Smith; "Decoupled Access/Execute Computer Architectures"; ACM Transactions on Computer Systems; Nov. 1984, vol. 2, Issue 4, pp. 289-308.

JP2002-358288 and Non-patent literature documents No. 5 by Atsuhiro Suga cited in the above listed JPOA were submitted in the IDS filed on May 20, 2014 and considered by the Examiner on Sep. 23, 2014.

* cited by examiner

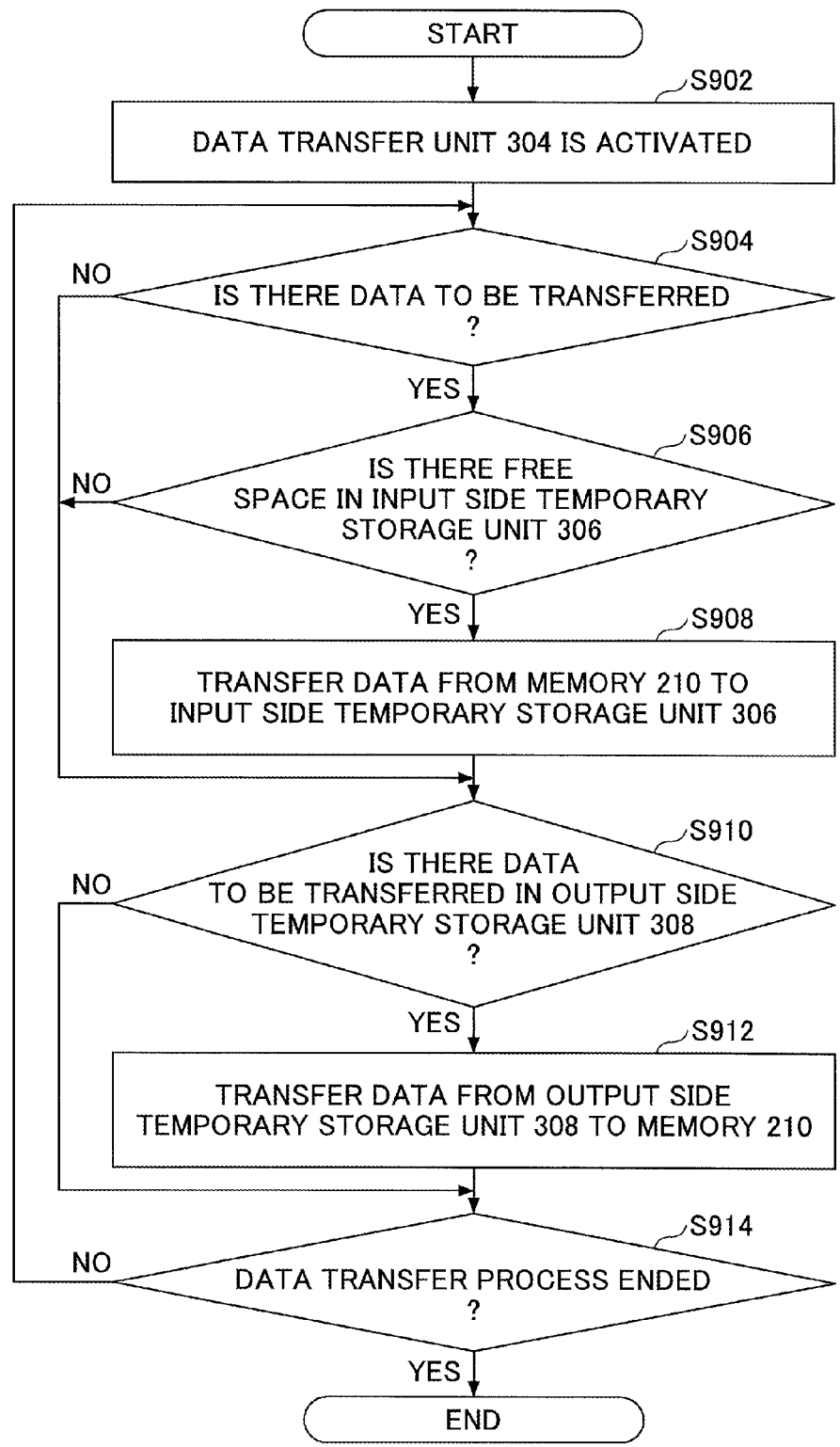

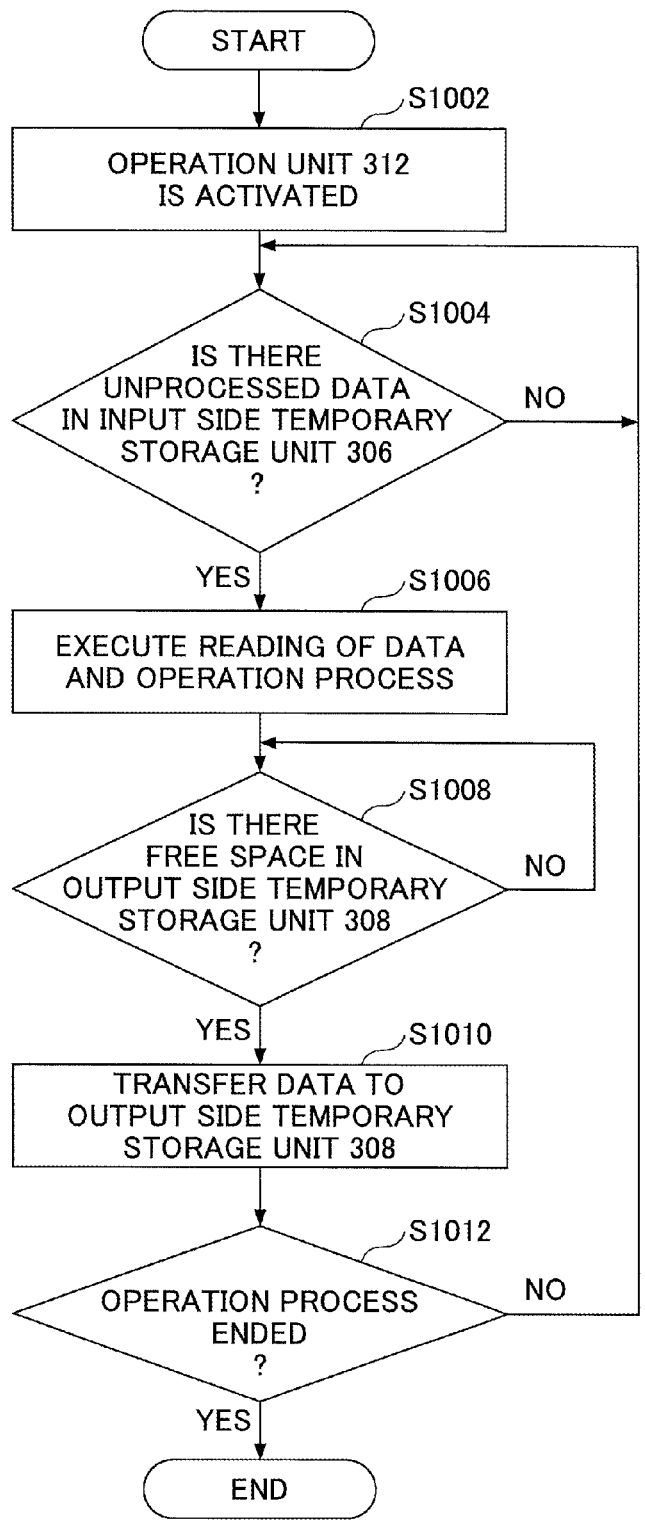

SIGNAL PROCESSING DEVICE AND SIGNAL PROCESSING METHOD

CROSS-REFERENCE TO RELATED APPLICATION

This application is a U.S. continuation application filed under 35 USC 111(a) claiming benefit under 35 USC 120 and 365(c) of PCT Application PCT/JP2011/077427 filed on Nov. 28, 2011, the entire contents of which are incorporated herein by reference.

FIELD

The embodiments discussed herein are related to a signal processing device.

BACKGROUND

In the field of mobile communication, new communication methods are being standardized and put to practical use one after the other. When a new communication method is put to practical use, the communication method is gradually switched from the present communication method to the new communication method. Therefore, during the transitional period when switching from the present communication method to the new communication method, there are cases where a single mobile terminal supports a plurality of communication methods.

When supporting a plurality of communication methods with a single mobile terminal, an exclusive hardware component may be prepared for each communication method. However, by the method of preparing an exclusive hardware component for each communication method, the circuit scale of the mobile terminal becomes large. When the circuit scale of the mobile terminal becomes large, problems may arise, such an increase in cost and an increase in power consumption.

Furthermore, when a standardized specification is updated, the mobile terminal needs to flexibly correspond to the updated specification. By the method of preparing an exclusive hardware component for each communication method, it is not possible to quickly correspond to the updated specification.

For the above reasons, there is demand for realizing the supporting of a plurality of communication methods by a single mobile terminal, by Software Defined Radio (SDR). Software Defined Radio is for implementing the communication method by software. Specifically, a radio is constituted such that wireless processes are realized with the use of programs of a processor and a rewritable logic. By realizing the wireless processes by Software Defined Radio, it is possible to switch the communication method by changing the software, without changing the hardware.

As the method of realizing a radio by software, there is a method of using a processor and a method of using reconfigurable hardware. When realizing a radio by software, it is easy to use a processor developed by a typical method, and therefore the method of using a processor is mainstream. By using reconfigurable hardware, the configuration of the hardware is dynamically modified at the time of execution.

Meanwhile, a significantly high transmission rate has been demanded by wireless communication methods of recent years. In accordance with the increase in the transmission rate, the demanded operation processing performance of the mobile terminal is significantly increasing. Wireless communication methods of recent years include a wireless communication method of using an OFDM (Orthogonal Frequency Division Multiplex) method, which is typified by a LTE (Long Term Evolution) method. In a wireless communication method using an OFDM method, a large number of wireless resources are prepared, which are deployed in the frequency direction and the time direction, to increase the overall transmission rate.

In a process of realizing a wireless communication method such as the OFDM method, a configuration that hardly needs complex control, and that is capable of efficiently executing the repetition of a simple process, is appropriate. Here, complex control includes a branching process using operation results.

Furthermore, as a method of improving the operation performance, there is a method of combining a plurality of instructions to form one instruction of a long word, and simultaneously executing the plurality of instructions. For example, there is a technology of using VLIW (Very Long Instruction Word). VLIW is a type of an architecture of a processor, which is a method of preparing a plurality of functions, combining the instructions for operating the functions into a single instruction, and executing the single instruction of a long word.

With respect to a signal processing device, there is a device by which the circuit scale is prevented from increasing rapidly, even when the parallelism of the computing unit is increased (see, for example, Patent Document 1).

Patent Document 1: Japanese Laid-Open Patent Publication No. 2011-141791

In a method of using VLIW, there are many cases where the combined plurality of instructions do not have a direct causal relationship. In a method of using VLIW, as a result of substantially simultaneously executing a plurality of combined instructions, the execution of a certain instruction is hampered due to a stall, which is caused by another instruction that does not have a causal relationship with the certain execution. A stall means that the processing stops dues to some factor. For example, when the cycle time of the processor and the cycle time of the memory are different, the operation of the device of the faster cycle time may stop (stall). When the cycle time of the memory is slower than the cycle time of the processor, the operation of the processor stops.

Specifically, the LOAD instruction and the OPERATION instruction are substantially simultaneously executed, and when the LOAD instruction stalls, the OPERATION instruction also stalls due to the stall of the LOAD instruction.

FIG. 1 illustrates an example of a time chart of a process using VLIW (part 1). In FIG. 1, the horizontal axis indicates the time. For example, the horizontal axis indicates the "cycle". In FIG. 1, the cycles are denoted by (1) through (10). In FIG. 1, the loaded data is used for executing an operation 1-1 (OP 1-1). That is to say, for executing the operation 1-2 (OP 1-2) and the operation 1-3 (OP 1-3), the loaded data is not directly used.

In cycle (1), a process of loading data 1 (data1) is executed (LD1).

In cycle (2), the operation 1-1 is executed, by using the data 1 loaded in cycle (1).

In cycle (3), the operation 1-2 is executed.

In cycle (4), the process of loading data 2 (data2) is executed (LD2), and the operation 1-3 is executed.

In cycle (5), the operation 1-1 is executed, by using the data 2 loaded in cycle (4).

In cycle (6), the operation 1-2 is executed.

In cycle (7), the process of loading data 3 (data3) is executed (LD3), and the operation 1-3 is executed.

In cycle (8), the operation 1-1 is executed, by using the data 3 loaded in cycle (7).

In cycle (9), the operation 1-2 is executed.

In cycle (10), the process of loading data 4 is executed (LD4), and the operation 1-3 is executed.

In the example of FIG. 1, the load process and the operation process are executed in one cycle. In the example of FIG. 1, a stall does not occur.

FIG. 2 illustrates an example of a time chart of a process using VLIW (part 2). In FIG. 2, the horizontal axis indicates the time. For example, the horizontal axis indicates the "cycle". In FIG. 2, the cycles are denoted by (1) through (14). In FIG. 2, the loaded data is used for executing an operation 1-1 (OP 1-1). That is to say, for executing the operation 1-2 (OP 1-2) and the operation 1-3 (OP 1-3), the loaded data is not directly used.

In cycle (1) and cycle (2), the loading of the data is executed in two cycles (LD1). A stall is occurring in the first cycle among the two cycles in which the loading of the data is executed. That is to say, when reading the data from the memory, a stall of one cycle occurs.

In cycle (3), the operation 1-1 is executed, by using the data 1 (data1) read in cycle (2).

In cycle (4), the operation 1-2 is executed.

In cycle (5) and cycle (6), the loading of the data is executed in two cycles (LD2). Furthermore, in cycle (5) and cycle (6), the operation 1-3 is executed in two cycles. However, a stall is occurring in the first cycle among the two cycles in which the loading of the data is executed, and therefore a stall is occurring in the first cycle among the two cycles in which the operation 1-3 is executed. Normally, the operation instruction is executable in one cycle if the data needed for execution is provided. However, due to the impact of the stall occurring at the time of loading the data, a stall occurs in operation 1-3, and there are two cycles.

In cycle (7), the operation 1-1 is executed, by using the data 2 read in cycle (6).

In cycle (8), the operation 1-2 is executed.

In cycle (9) and cycle (10), the loading of the data is executed in two cycles (LD3). Furthermore, in cycle (9) and cycle (10), the operation 1-3 is executed in two cycles. However, a stall is occurring in the first cycle among the two cycles in which the loading of the data is executed, and therefore a stall is occurring in the first cycle among the two cycles in which the operation 1-3 is executed.

In cycle (11), the operation 1-1 is executed, by using the data 3 read in cycle (10).

In cycle (12), the operation 1-2 is executed.

In cycle (13) and cycle (14), the loading of the data is executed in two cycles (LD4). Furthermore, in cycle (13) and cycle (14), the operation 1-3 is executed in two cycles. However, a stall is occurring in the first cycle among the two cycles in which the loading of the data is executed, and therefore a stall is occurring in the first cycle among the two cycles in which the operation 1-3 is executed.

In the example of FIG. 2, the program needs to be described such that before the data, which is loaded according to a load instruction, is overwritten by a load instruction that is subsequently executed, an operation instruction using the data is executed. Specifically, before the data loaded in cycle (2) is overwritten by the data loaded in cycle (6), an operation instruction using the data loaded in cycle (2) needs to be executed. That is to say, the timings of executing the transfer instruction and the operation instruction need to be precisely defined. This is because the transfer instruction and the operation instruction affect each other. In the example of FIG. 2, a stall may frequently occur, and therefore it is difficult to describe a program such that a stall is avoided.

Furthermore, when the operation efficiency deteriorates due to a stall, a large number of hardware components are needed for realizing the same processing amount. When a large number of hardware components are used, problems arise in that the circuit scale and power consumption increase.

SUMMARY

According to an aspect of the embodiments, a signal processing device includes an operation control unit configured to control a timing of an operation process executed by an operation unit; and a transfer control unit configured to control a timing of transferring data that is a target of the operation process, such that the data that is the target of the operation process is loaded by the operation unit according to the timing of the operation process controlled by the operation control unit.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 9 is a flowchart indicating operations of the signal processing device according to an embodiment;

FIG. 10 is a flowchart indicating operations of the signal processing device according to an embodiment;

DESCRIPTION OF EMBODIMENTS

Figure 1:
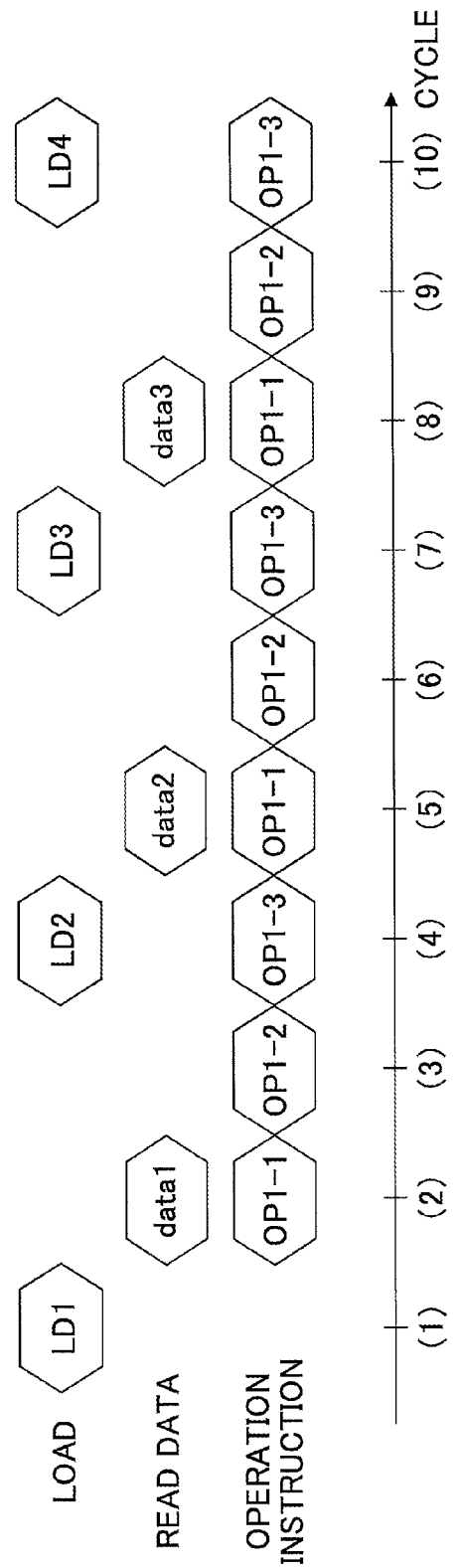
FIG. 1 illustrates an example of a time chart of a process using VLIW (part 1)
Figure 2:
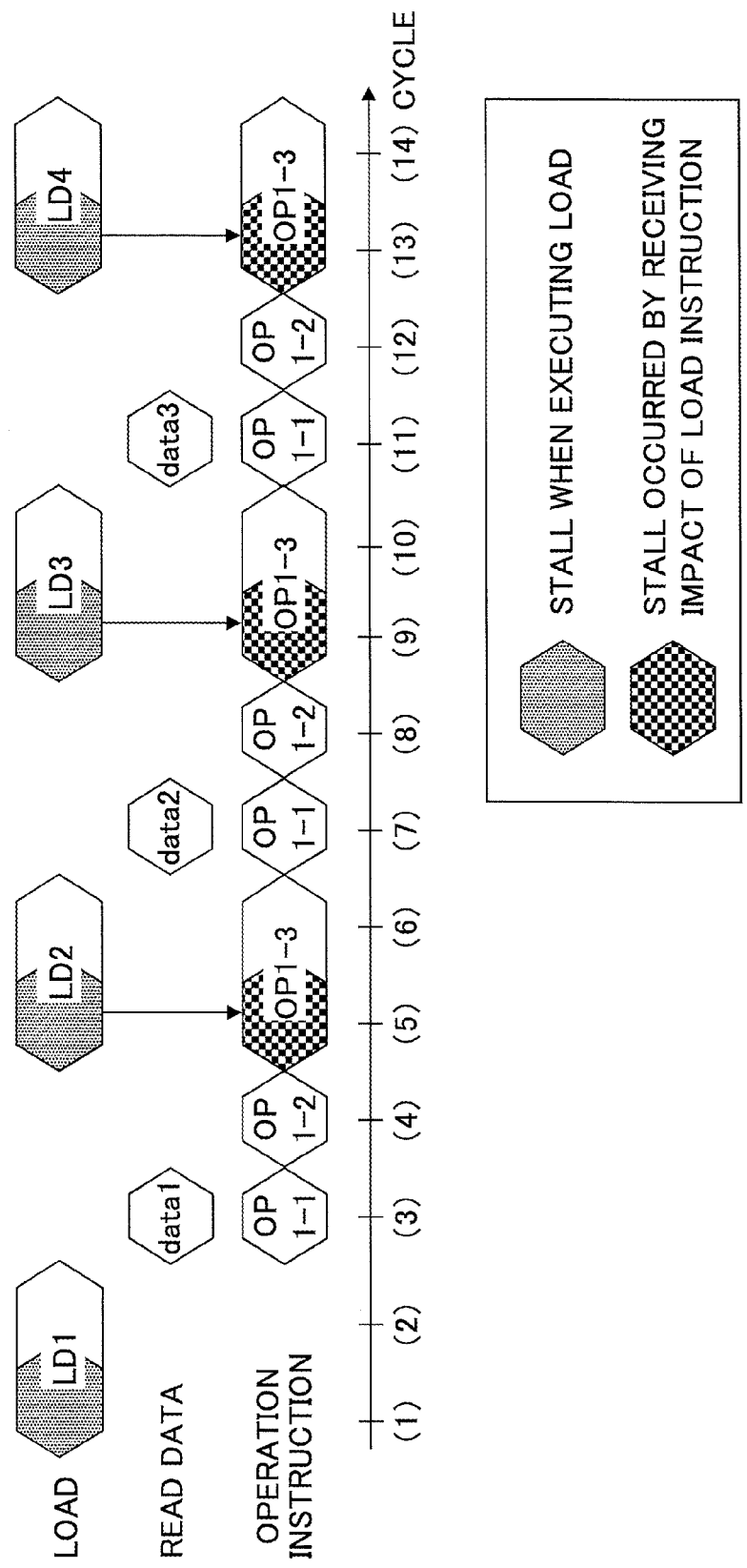
FIG. 2 illustrates an example of a time chart of a process using VLIW (part 2)

Preferred embodiments of the present invention will be explained with reference to accompanying drawings.

Note that in all figures for describing the embodiments, elements having the same function are denoted by the same reference numerals, and redundant descriptions are omitted.

Mobile Terminal 100

Figure 3:
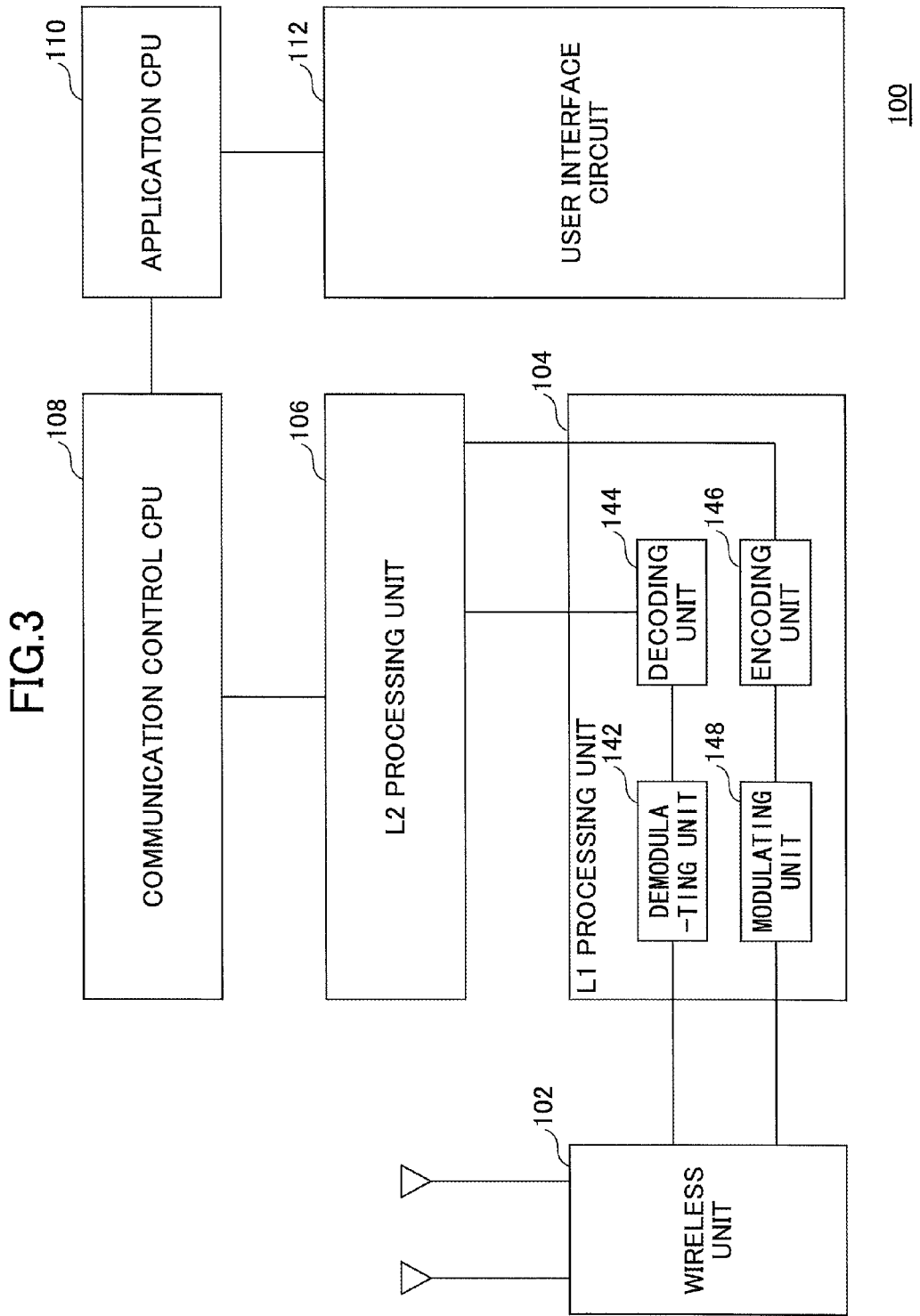
FIG. 3 illustrates a mobile terminal according to an embodiment.

FIG. 3 illustrates a mobile terminal 100 according to an embodiment. FIG. 3 mainly illustrates a hardware configuration.

The mobile terminal 100 includes a wireless unit 102, an L1 processing unit 104, an L2 processing unit 106, a communication control CPU 108, an application CPU 110, and a user interface circuit 112.

The wireless unit 102 converts modulation waves from the L1 processing unit 104 into high frequency signals. The wireless unit 102 amplifies the high frequency signals with a power amplifier, and sends the amplified signals from an antenna. Furthermore, the wireless unit 102 amplifies wireless signals from the antenna, and inputs the amplified signals in the L1 processing unit 104.

The L1 processing unit 104 is connected to the wireless unit 102. The L1 processing unit 104 performs processes relevant to wireless signals, i.e., process relevant to the physical layer. The L1 processing unit 104 includes a demodulating unit 142 that demodulates signals from the wireless unit 102. The L1 processing unit 104 includes a decoding unit 144 that decodes the signals demodulated by the demodulating unit 142. The signals decoded by the decoding unit 144 are input to the L2 processing unit 106. Furthermore, the L1 processing unit 104 includes an encoding unit 146 that performs an encoding process on transmission data. The L1 processing unit 104 includes a modulating unit 148 that performs a modulation process on the transmission data encoded by the encoding unit 146. The signals modulated by the modulating unit 148 are input to the wireless unit 102.

The L2 processing unit 106 is connected to the L1 processing unit 104. The L2 processing unit 106 performs processes relevant to the layer 2, with the base station (not illustrated). The layer 2 provides transmission services of a logical channel to the layer 3. A logical channel is constituted by a control channel (CCH) and a traffic channel (TCH). The transmission of these channels is realized by functions of the RLC (Radio Link Control) sublayer and the MAC (Medium Access Control) sublayer. The RLC sublayer provides, to the higher layer, services of transparent data transfer, unacknowledged data transfer, acknowledged data transfer, and QoS setting. The MAC sublayer provides, to the higher layer, services such as mapping to a transport channel of the logical channel, priority control, flow control, flow rate monitoring, and reporting to RRC (Radio Resource Control).

The communication control CPU 108 is connected to the L2 processing unit 106. The communication control CPU 108 performs communication control of transmission/reception of control signals.

The application CPU 110 is connected to the communication control CPU 108. The application CPU 110 processes applications installed in the mobile terminal 100.

The user interface circuit 112 is connected to the application CPU 110. The user interface circuit 112 outputs information to the user. The user interface circuit 112 may output processing results obtained by the application CPU 110.

In an embodiment of the mobile terminal 100, the L1 processing unit 104 may be realized by a software defined radio, to correspond to a plurality of wireless communication methods. The L1 processing unit 104 includes a plurality of functions. FIG. 3 illustrates, as examples of the plurality of functions, the demodulating unit 142, the decoding unit 144, the encoding unit 146, and the modulating unit 148. Other functions may be included, and one of the plurality of functions illustrated in FIG. 3 may be included. The functions are executed by one or more processors. Specifically, in order to realize the L1 processing unit 104 by a software defined radio, the L1 processing unit 104 includes a DSP (Digital Signal Processor), an accelerator, and a memory.

Figure 4:
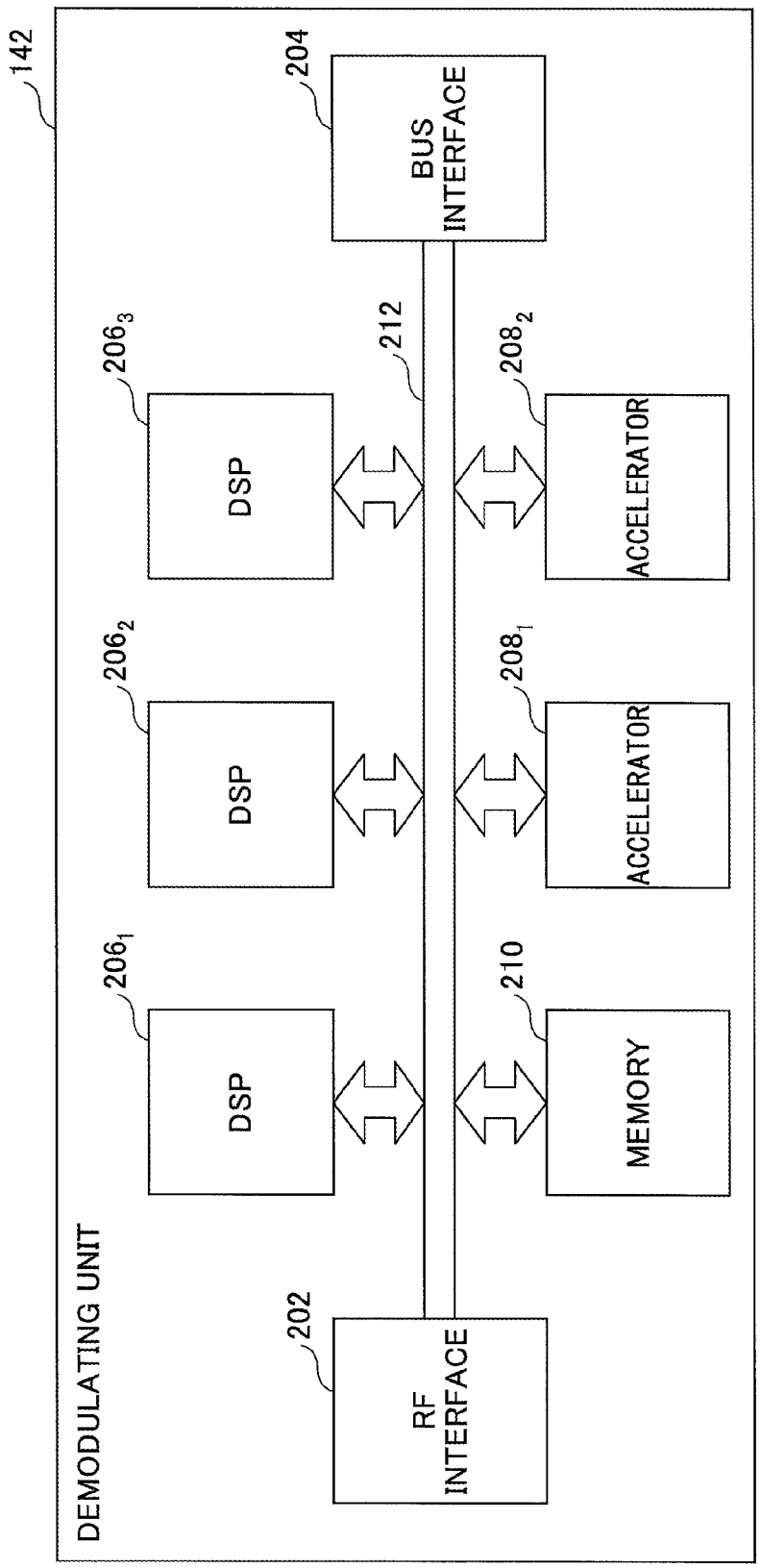
FIG. 4 illustrates an embodiment of a demodulating unit.

FIG. 4 illustrates an embodiment of the demodulating unit 142 of the L1 processing unit 104. FIG. 4 mainly illustrates a hardware configuration.

The demodulating unit 142 includes an RF interface 202, a bus interface 204, DSPs $206_1$ through $206_3$, accelerators $208_1$ through $208_2$, and a memory 210. The RF interface 202, the bus interface 204, the DSPs $206_1$ through $206_3$, the accelerators $208_1$ through $208_2$, and the memory 210 are interconnected by a bus 212. FIG. 4 illustrates an example where three DSPs are included in the demodulating unit 142; however, the number of DSPs may be one or two, or four or more. Furthermore, FIG. 4 illustrates an example where two accelerators are included in the demodulating unit 142; however, the number of accelerators may one or three or more.

The circuit scale of the L1 processing unit 104 is affected by the number of processors included in each unit. By improving the operation performance of the processor, it is possible to reduce the number of processors included in each unit. By reducing the number of processors included in each unit, the circuit scale of the L1 processing unit 104 may be reduced.

The modulating unit 148 may be realized by substantially the same hardware configuration as that of the demodulating unit 142. The decoding unit 144 and the encoding unit 146 may also be realized by substantially the same hardware configuration as that of the demodulating unit 142. However, the bus interface 204 may be included instead of the RF interface 202.

The RF interface 202 is an interface between the demodulating unit 142 and the wireless unit 102.

The bus interface 204 is an interface between the demodulating unit 142 and the decoding unit 144.

The DSPs $206_1$ through $206_3$ process signals from the wireless unit 102. That is to say, the DSPs $206_1$ through $206_3$ execute a process of demodulating signals from the wireless unit 102. In the following, the DSPs $206_1$ through $206_3$ may also be referred to as a signal processing device. When executing the process of demodulating the signals from the wireless unit 102, the process may be executed by being divided among all of the DSPs, or the process may be executed by some of the DSPs.

The accelerators $208_1$ through $208_2$ improve the processing capacity of the DSPs $206_1$ through $206_3$. Depending on the processing capacity of the DSPs $206_1$ through $206_3$, the accelerators $208_1$ through $208_2$ are not always needed.

The memory 210 temporarily stores the signals from the wireless unit 102.

Signal Processing Device

Figure 5:
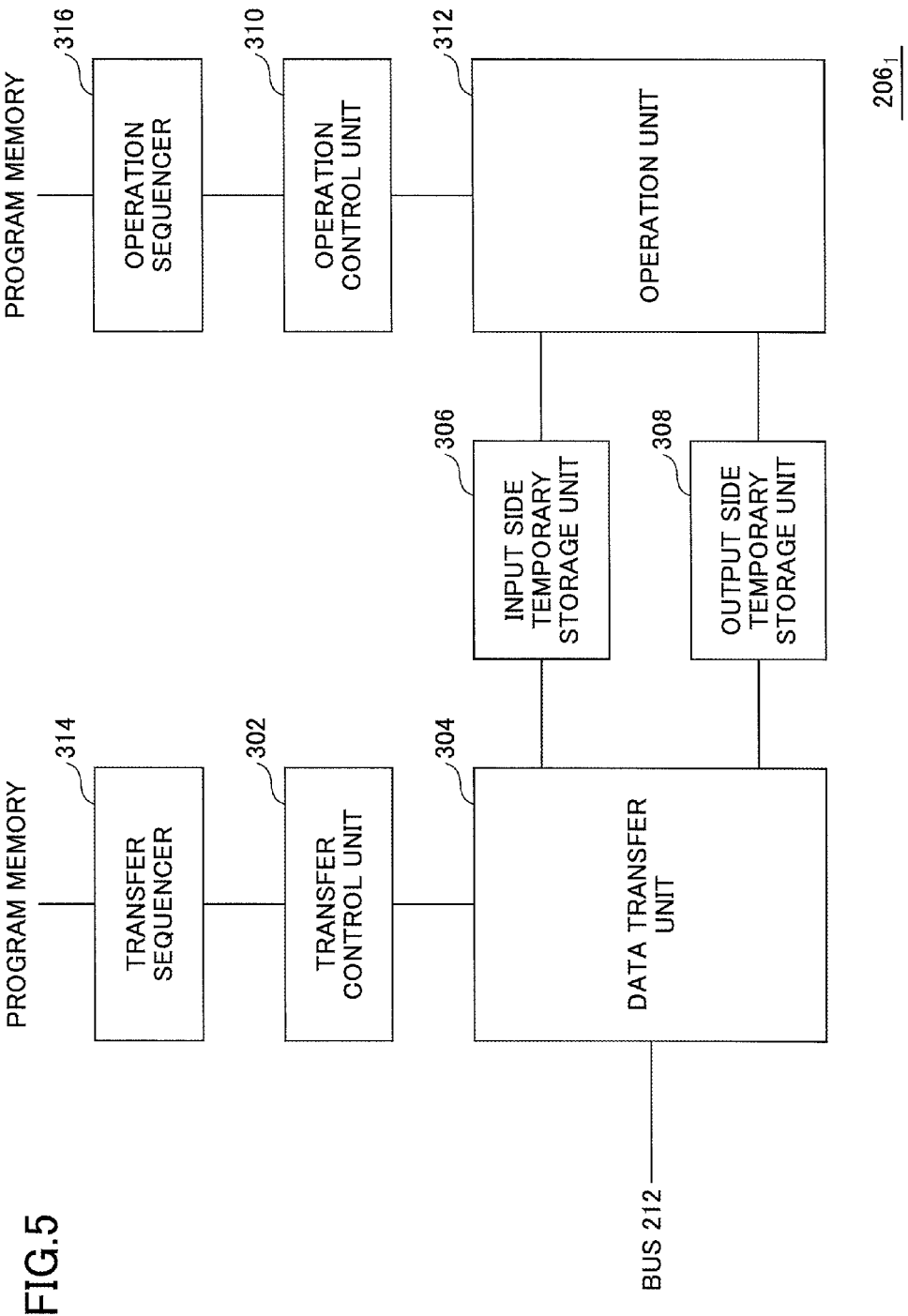
FIG. 5 illustrates an embodiment of a signal processing device.

FIG. 5 illustrates an embodiment of functions of a signal processing device. FIG. 5 illustrates an embodiment of functions of the DSPs $206_1$ through $206_3$, as an embodiment of a signal processing device.

The DSPs $206_1$ through $206_3$ are expressed by substantially the same functional block diagram, and therefore FIG. 3 illustrates the DSP $206_1$ as a representative example.

The DSP $206_1$ includes a transfer control unit 302, a data transfer unit 304, an input side temporary storage unit 306, an output side temporary storage unit 308, an operation control unit 310, an operation unit 312, a transfer sequencer 314, and an operation sequencer 316.

The transfer control unit 302 implements control of writing, into the input side temporary storage unit 306, the data stored in the memory 210 according to need. Furthermore, the transfer control unit 302 implements control of transferring, to the decoding unit 144, the data written in the output side temporary storage unit 308. The data to be written into the input side temporary storage unit 306 includes the data processed by the operation unit 312. The transfer control unit 302 may implement control of transferring data to the decoding unit 144 via the bus 212 and the bus interface 204. Furthermore, the transfer control unit 302 may implement control of transferring data to the memory 210.

Specifically, the transfer control unit 302 performs the process of transferring data described above, according to an instruction issued by the transfer sequencer 314, which is activated as a program for a demodulation process is executed. For example, the transfer sequencer 314 sequentially extracts instructions stored in a program memory, and issues an instruction to the transfer control unit 302. The transfer sequencer 314 stores the address in the program memory of the instruction that is currently being executed. The transfer sequencer 314 may use a register for storing the address in the program memory of the instruction that is currently being executed.

The transfer control unit 302 starts accessing the memory 210 according to an instruction from the transfer sequencer 314. When starting to access the memory 210, the transfer control unit 302 outputs information indicating that access will be made. In response to the information indicating that access will be made, the memory 210 sends a response by information indicating whether access to the memory 210 is possible. The information indicating whether access to the memory 210 is possible includes information indicating whether reading data from the memory 210 is possible. Furthermore, the information indicating whether access to the memory 210 is possible, may include information indicating whether writing into the memory 210 is possible. When it is possible to access the memory 210 based on the information indicating whether access to the memory 210 is possible, the transfer control unit 302 controls the data transfer unit 304 to transfer, to the operation unit 312, the data read from the memory 210. In this case, according to need, after the data read from the memory 210 is stored in the input side temporary storage unit 306, the data is transferred to the operation unit 312.

For example, when VLIW is used to perform the processing, the transfer control unit 302 handles a process having one function as one instruction. The transfer control unit 302 bundles together the plurality of instructions, and executes them as a single instruction. The instruction includes "load" for reading data from the memory 210, "store" for writing the data in the memory 210, and "operation", "branch" for performing operations on the data read from the memory 210. The transfer control unit 302 combines the instructions of these types, and creates a single long instruction. Specifically, among the instructions of these types, the transfer control unit 302 may combine "load" and "store" and create a single instruction.

By combining the instructions and creating a single long instruction, it is possible to execute a plurality of processes by a single instruction. As a plurality of processes may be executed by a single instruction, it is possible to improve the processing capacity. As the processing capacity may be improved, it is possible to reduce the processors used for processing. However, there are cases where the processes of different types are executed at different timings, and the instructions included in a single instruction are not usually related to each other. That is to say, there are cases where the data loaded according to a load instruction in the combined instructions is not used in an operation instruction included in the same instruction.

The data transfer unit 304 is connected to the transfer control unit 302 and the bus 212. The data transfer unit 304 performs a process of inputting, to the operation unit 312, the data read from the memory 210. The data transfer unit 304 performs a process of writing, into the input side temporary storage unit 306, the data read from the memory 210, according to the control by the transfer control unit 302. Furthermore, the data transfer unit 304 performs a process of transferring, to the bus 212, the data written into the output side temporary storage unit 308, according to the control by the transfer control unit 302. The data written into the output side temporary storage unit 308 includes the data processed by the operation unit 312. The data transfer unit 304 transfers the data to the decoding unit 144, via the bus 212 and the bus interface 204.

The input side temporary storage unit 306 is connected to the data transfer unit 304. The input side temporary storage unit 306 temporarily stores the data from the data transfer unit 304.

The output side temporary storage unit 308 is connected to the data transfer unit 304. The output side temporary storage unit 308 temporarily stores the data from the operation unit 312.

The operation control unit 310 implements control of the operation process executed by the operation unit 312. For example, the operation control unit 310 implements control relevant to matrix operations for the demodulation process. For example, the operation control unit 310 controls the operation unit 312 to implement control of performing an operation process on data from the data transfer unit 304. Furthermore, for example, the operation control unit 310 controls the operation unit 312, to implement control of acquiring the data written into the input side temporary storage unit 306. Furthermore, for example, the operation control unit 310 controls the operation unit 312, to implement control of performing an operation process on data from the input side temporary storage unit 306. Furthermore, for example, the operation control unit 310 controls the operation unit 312 to implement control of outputting data to the output side temporary storage unit 308.

For example, the operation control unit 310 may create an "operation" instruction. Specifically, the operation control unit 310 implements control relevant to the operation process described above, according to the instruction issued by the operation sequencer 316 activated by executing a program for a demodulation process. For example, the operation sequencer 316 sequentially extracts instructions stored in the program memory, and issues an instruction to the operation control unit 310. The operation sequencer 316 stores an address in the program memory of the instruction that is currently being executed. The operation sequencer 316 may use a register for storing the address in the program memory of the instruction that is currently being executed.

The operation unit 312 is connected to the operation control unit 310, the input side temporary storage unit 306, and the output side temporary storage unit 308. The operation unit 312 performs an operation process relevant to a demodulation process, according to control by the operation control unit 310. Specifically, the operation unit 312 acquires data from the data transfer unit 304 according to need via the input side temporary storage unit 306. The operation unit 312 performs an operation relevant to demodulation, with the use of this data. The operation unit 312 outputs the operation result to the data transfer unit 304. When outputting the operation result to the data transfer unit 304, the operation result is output via the output side temporary storage unit 308 according to need.

In layers higher than the transfer sequencer 314 and the operation sequencer 316, a processor (not illustrated) and a control circuit (not illustrated) are present. The transfer sequencer 314 and the operation sequencer 316 operate according to instructions from the processor and the control circuit.

In response to instructions from the processor and the control circuit, the transfer sequencer 314 and the operation sequencer 316 substantially simultaneously start executing programs. Alternatively, in response to instructions from the processor and the control circuit, the transfer sequencer 314 may start processing slightly earlier than the operation sequencer 316.

The data that is loaded from the memory 210 by the data transfer unit 304 is temporarily buffered in the input side temporary storage unit 306, according to need. The operation unit 312 reads the data buffered in the input side temporary storage unit 306, and executes an operation process. The operation unit 312 may read the data buffered in the input side temporary storage unit 306, by a FIFO (First-In First-Out) method. The operation unit 312 outputs the data that has undergone the operation process to the output side temporary storage unit 308 according to need.

When data is stored in the output side temporary storage unit 308, the transfer sequencer 314 issues an instruction to store the data to the memory 210. The transfer control unit 302 controls the data transfer unit 304 according to the instruction for storing the data.

The transfer sequencer 314 and the operation sequencer 316 may achieve synchronization by using a full flag and an empty flag of FIFO. By such a configuration, the operation unit 312 may always access the data to be processed. As the operation unit 312 may always access the data to be processed, it is possible to reduce the occurrence of stalls. Furthermore, when a stall occurs when the data transfer unit 304 is executing loading, the stall is canceled out by the input side temporary storage unit 306. Therefore, it is possible to reduce stalls in the operation unit 312.

Time Chart (Part 1)

Figure 6:
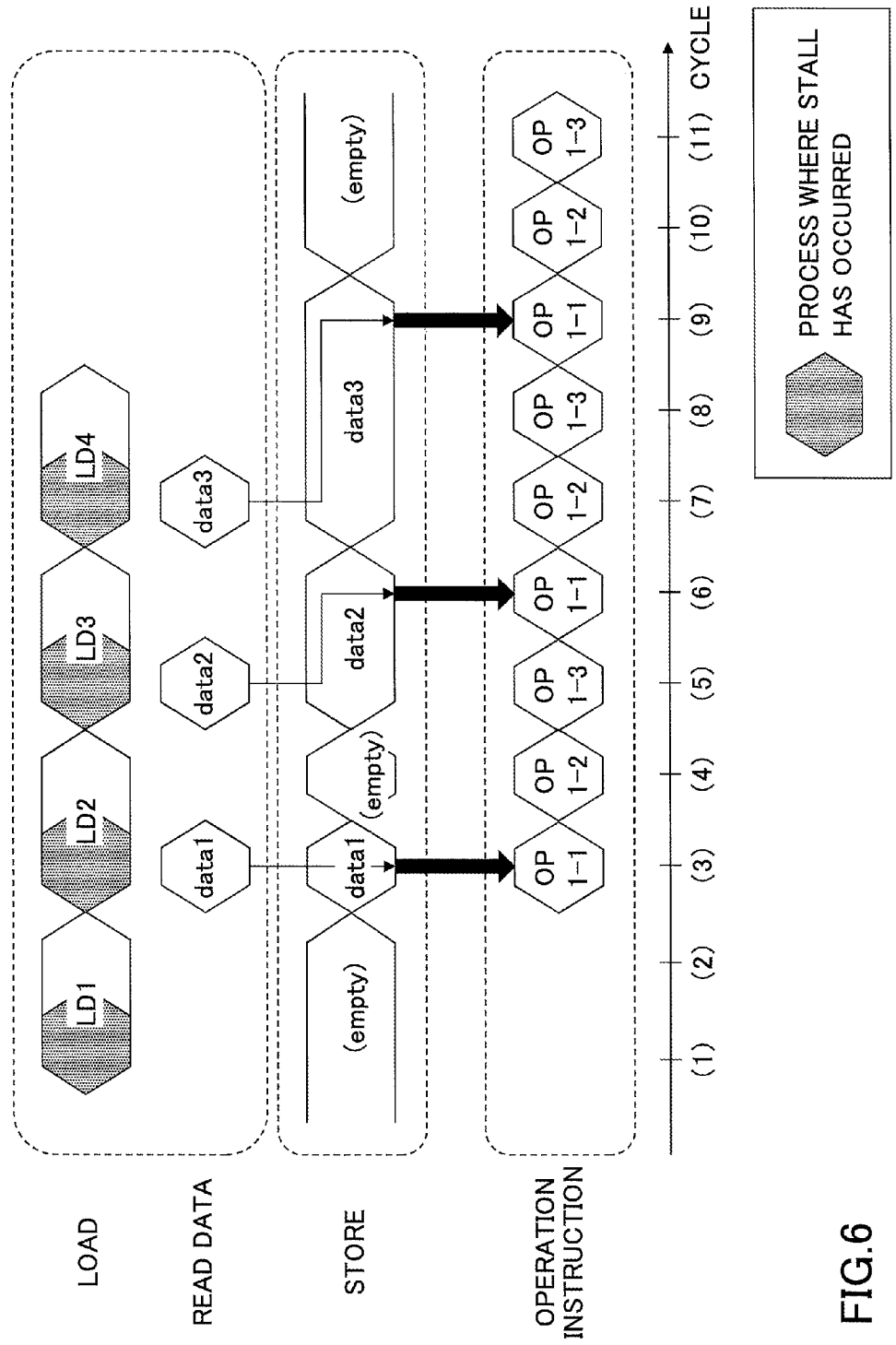
FIG. 6 is a time chart of a process executed by the signal processing device (part 1)

FIG. 6 illustrates a process executed by the signal processing device (part 1). In FIG. 6, the horizontal axis indicates the time. For example, the horizontal axis indicates the "cycle". In FIG. 6, the cycles are denoted by (1) through (11). The operation unit 312 uses the loaded data for executing an operation 1-1 (OP 1-1). That is to say, for executing the operation 1-2 (OP 1-2) and the operation 1-3 (OP 1-3), the loaded data is not directly used.

According to control by the transfer control unit 302, the data transfer unit 304 temporally continuously executes the loading of data. For example, load instructions are sequentially issued from the transfer sequencer 314. The data transfer unit 304 performs a transfer process by maximum capacity, according to the load instruction. The operation unit 312 starts processing in a state where it is possible to read the temporarily stored data.

In cycle (1) and cycle (2), an instruction for executing the loading of data is issued from the transfer sequencer 314. In cycle (1) and cycle (2), according to control by the transfer control unit 302, the data transfer unit 304 executes the loading of data in two cycles (LD1). A stall is occurring in the first cycle among the two cycles in which the loading of the data is executed. This stall may occur due to the impact of another transfer operation, or may occur because the transfer speed is slow. Executing the loading of data in two cycles is one example; the loading of data may be executed in one cycle or three or more cycles.

In cycle (3), an instruction for executing the loading of data is issued from the transfer sequencer 314. In cycle (3), according to control by the transfer control unit 302, the data transfer unit 304 executes the loading of data (LD2). In cycle (3), a stall is occurring. In cycle (3), according to control by the transfer control unit 302, the data transfer unit 304 writes, into the input side temporary storage unit 306, the data 1 (data1) that is loaded in cycle (2) by the data transfer unit 304. Furthermore, in cycle (3), an instruction for executing the operation 1-1 is input from the operation control unit 310 to the operation unit 312. In order to execute the operation 1-1, the operation unit 312 acquires the data 1 from the input side temporary storage unit 306. The operation unit 312 discards the data 1 from the input side temporary storage unit 306.

In cycle (4), according to control by the transfer control unit 302, the data transfer unit 304 continues loading the data (LD2). In cycle (4), the loading of the data is executed. In cycle (4), an instruction for executing an operation 1-2 is issued from the operation sequencer 316. In cycle (4), an instruction for executing the operation 1-2 is output from the operation control unit 310 to the operation unit 312. The operation 1-2 may be a process for using the results of the operation 1-1.

In cycle (5), an instruction for executing the loading of data is issued from the transfer sequencer 314. In cycle (5), according to control by the transfer control unit 302, the data transfer unit 304 executes the loading of the data (LD3). In cycle (5), a stall is occurring. In cycle (5), according to control by the transfer control unit 302, the data transfer unit 304 writes, into the input side temporary storage unit 306, the data 2 that is loaded in cycle (4) by the data transfer unit 304. Furthermore, in cycle (5), an instruction for executing the operation 1-3 is issued from the operation sequencer 316. In cycle (5), an instruction for executing the operation 1-3 is output from the operation control unit 310 to the operation unit 312. The operation 1-3 may be a process for using the results of the operation 1-1. The operation unit 312 does not acquire the data 2 from the input side temporary storage unit 306, and therefore data 2 remains written in the input side temporary storage unit 306.

In cycle (6), according to control by the transfer control unit 302, the data transfer unit 304 continues the loading of the data (LD3). In cycle (6), the loading of the data is executed. Furthermore, in cycle (6), an instruction for executing the operation 1-1 is issued from the operation sequencer 316. In cycle (6), an instruction for executing the operation 1-1 is output from the operation control unit 310 to the operation unit 312. In order to execute the operation 1-1, the operation unit 312 acquires the data 2 from the input side temporary storage unit 306. The operation unit 312 discards the data 2 from the input side temporary storage unit 306.

In cycle (7), an instruction for executing the loading of data is issued from the transfer sequencer 314. In cycle (7), according to control by the transfer control unit 302, the data transfer unit 304 executes the loading of the data (LD4). In cycle (7), a stall is occurring. In cycle (7), according to control by the transfer control unit 302, the data transfer unit 304 writes, into the input side temporary storage unit 306, the data 3 (data3) that is loaded in cycle (6) by the data transfer unit 304. Furthermore, in cycle (6), an instruction for executing the operation 1-2 is issued from the operation sequencer 316. In cycle (7), an instruction for executing the operation 1-2 is output from the operation control unit 310 to the operation unit 312. The operation 1-2 may be a process for using the results of the operation 1-1. The operation unit 312 does not acquire the data 3 from the input side temporary storage unit 306, and therefore data 3 remains written in the input side temporary storage unit 306.

In cycle (8), according to control by the transfer control unit 302, the data transfer unit 304 continues the loading of the data (LD4). In cycle (8), the loading of the data is executed. Furthermore, in cycle (8), an instruction for executing the operation 1-3 is issued from the operation sequencer 316. In cycle (8), an instruction for executing the operation 1-3 is output from the operation control unit 310 to the operation unit 312. The operation 1-3 may be a process for using the results of the operation 1-2. The operation unit 312 does not acquire the data 3 from the input side temporary storage unit 306, and therefore data 3 remains written in the input side temporary storage unit 306.

In cycle (9), an instruction for executing the operation 1-1 is issued from the operation sequencer 316. In cycle (9), an instruction for executing the operation 1-1 is output from the operation control unit 310 to the operation unit 312. In order to execute the operation 1-1, the operation control unit 310 acquires data 3 from the input side temporary storage unit 306. The operation unit 312 discards the data 3 from the input side temporary storage unit 306.

In cycle (10), an instruction for executing the operation 1-2 is issued from the operation sequencer 316. In cycle (10), an instruction for executing the operation 1-2 is output from the operation control unit 310 to the operation unit 312.

In cycle (11), an instruction for executing the operation 1-3 is issued from the operation sequencer 316. In cycle (11), an instruction for executing the operation 1-3 is output from the operation control unit 310 to the operation unit 312.

When the loading of data is executed a plurality of times by the data transfer unit 304, the data may be sequentially stored in the input side temporary storage unit 306. In order to execute the operation, the operation unit 312 may acquire data from the input side temporary storage unit 306 according to the FIFO method. In this case, there may be cases where there are a plurality of types of data and the data needs to be identified; however, the transfer order is controlled such that the data is arranged in the order of being operated on.

For example, when transfer control is implemented based on an instruction created with the use of VLIW, the part corresponding to the transfer instruction is extracted from the instruction created with the use of VLIW, and the data transfer unit 304 arranges the data in an order to be used at the input side temporary storage unit 306.

Furthermore, instead of acquiring the data according to the FIFO method from the input side temporary storage unit 306, paths to which the data is supplied may be identified. By identifying the paths to which the data is supplied, even in a case where the data transfer unit 304 has executed the loading of the data a plurality of times, it is possible to identify the data. By identifying the data, it is possible to acquire data to be the target of the operation instruction.

For example, when the data needs to be identified because there are a plurality of types of data to be operated according to the operation instruction, the same number of input side temporary storage units as the number of data items to be operated, may be prepared. The operation unit 312 selects an input side temporary storage unit in which the data to be used is written, from among the plurality of input side temporary storage units.

According to the time chart of FIG. 6, the loading of the data and the operation process may be separately controlled, and therefore the load instructions may be executed in temporally continuous cycles. As the load instructions may be executed in temporally continuous cycles, even when a stall occurs when reading from the memory, it is possible to prepare the data for executing the operation instruction in advance, when executing the operation instruction. As the data for executing the operation instruction may be prepared in advance, it is possible to reduce stalls of the operation instruction.

Assuming that an instruction is issued such that the data transfer instruction and the operation instruction are substantially simultaneously executed, even if the order of the data to be transferred is clearly known in advance, the data is not transferred until the transfer instruction is issued. When a transfer instruction is issued, and an instruction to transfer data is executed, a stall may occur due to the speed of the memory, or a stall may occur due to another device using the bus. Therefore, there may be cases where a delay occurs until the execution of an operation instruction that is programmed to be executed substantially simultaneously as the transfer instruction. According to the time chart of FIG. 6, by temporarily storing the loaded data, it is possible to cancel out the difference in terms of the time when the data is needed, between the data transfer unit 304 and the operation unit 312. Therefore, it is possible to reduce stalls caused by the speed of the memory and stalls caused by another device using the bus. Accordingly, it is possible to reduce the delay in executing an operation instruction.

Time Chart (Part 2)

Figure 7:
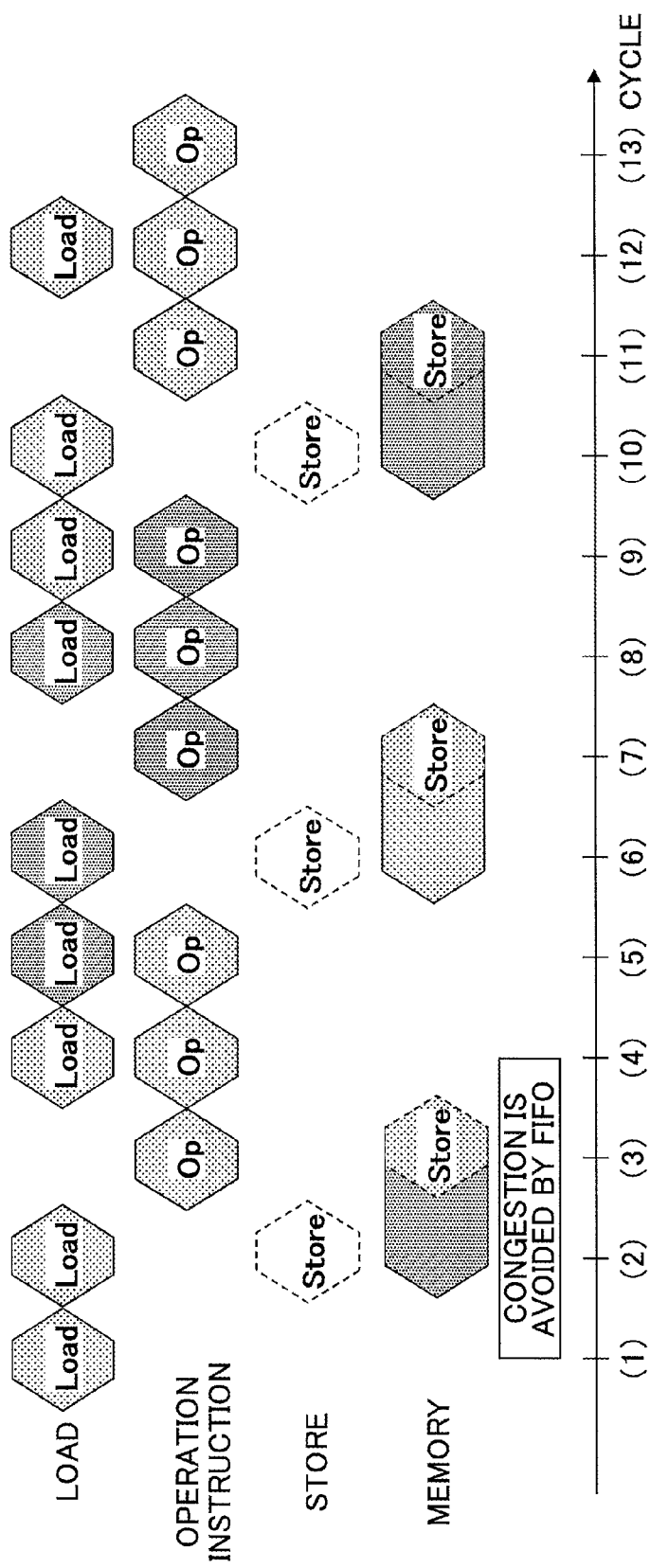
FIG. 7 is a time chart of a process executed by the signal processing device (part 2)

FIG. 7 illustrates a process executed by the signal processing device (part 2). In FIG. 7, the horizontal axis indicates the time. For example, the horizontal axis indicates the "cycle". In FIG. 7, the cycles are denoted by (1) through (13).

In cycle (1) and cycle (2), an instruction for executing the loading of data is issued from the transfer sequencer 314. In cycle (1) and cycle (2), according to control by the transfer control unit 302, the data transfer unit 304 executes the loading of data in the respective cycles.

Furthermore, in cycle (2), an instruction to store the data in the memory 210 is output from the operation control unit 310 to the operation unit 312. However, the memory 210 is stalled, and therefore the operation unit 312 writes the data in the output side temporary storage unit 308.

In cycle (3), an instruction for executing an operation is issued from the operation sequencer 316. In cycle (3), according to control by the operation control unit 310, the operation unit 312 executes an operation using the data loaded in cycle (1). Furthermore, according to control by the transfer control unit 302, the data transfer unit 304 transfers, to the memory 210, the data written in the output side temporary storage unit 308. The data transfer unit 304 outputs the data written in the output side temporary storage unit 308 by the FIFO method. As the output side temporary storage unit 308 is included, it is possible to separately control the loading of the data and the operation process, and therefore congestion is avoided. Furthermore, when there are a plurality of types of data that is transferred, the data needs to be identified, and the data needs to be supplied in the order in which the transfer instructions are issued. By outputting the data by the FIFO method, it is possible to supply the data in the order in which the transfer instructions are issued.

In cycle (4), an instruction to execute the loading of the data is issued from the transfer sequencer 314. In cycle (4), according to control by the transfer control unit 302, the data transfer unit 304 executes the loading of the data. In cycle (4), an instruction for executing an operation is issued from the operation sequencer 316. In cycle (4), according to control by the operation control unit 310, an operation is executed by the operation unit 312, by using the data loaded in cycle (2).

In cycle (5), an instruction to execute the loading of the data is issued from the transfer sequencer 314. In cycle (5), according to control by the transfer control unit 302, the loading of the data is executed by the data transfer unit 304. In cycle (5), an instruction for executing an operation is issued from the operation sequencer 316. In cycle (5), according to control by the operation control unit 310, an operation is executed by the operation unit 312, by using the data loaded in cycle (4).

In cycle (6), an instruction to execute the loading of the data is issued from the transfer sequencer 314. In cycle (6), according to control by the transfer control unit 302, the loading of the data is executed by the data transfer unit 304. Furthermore, in cycle (6), an instruction for storing the data in the memory 210 is output from the operation control unit 310 to the operation unit 312. However, the memory 210 is stalled, and therefore the operation unit 312 writes the data in the output side temporary storage unit 308.

In cycle (7), an instruction to execute an operation is issued from the operation sequencer 316. In cycle (7), according to control by the operation control unit 310, an operation is executed by the operation unit 312, by using the data loaded in cycle (5). Furthermore, according to control by the transfer control unit 302, the data transfer unit 304 transfers, to the memory 210, the data written in the output side temporary storage unit 308. The data transfer unit 304 outputs the data written in the output side temporary storage unit 308 by a FIFO method.

In cycle (8), an instruction to execute the loading of the data is issued from the transfer sequencer 314. In cycle (8), according to control by the transfer control unit 302, the loading of the data is executed by the data transfer unit 304. In cycle (8), an instruction for executing an operation is issued from the operation sequencer 316. In cycle (8), according to control by the operation control unit 310, an operation is executed by the operation unit 312, by using the data loaded in cycle (6).

In cycle (9), an instruction to execute the loading of the data is issued from the transfer sequencer 314. In cycle (9), according to control by the transfer control unit 302, the loading of the data is executed by the data transfer unit 304. In cycle (9), an instruction for executing an operation is issued from the operation sequencer 316. In cycle (9), according to control by the operation control unit 310, an operation is executed by the operation unit 312, by using the data loaded in cycle (8).

In cycle (10), an instruction to execute the loading of the data is issued from the transfer sequencer 314. In cycle (10), according to control by the transfer control unit 302, the loading of the data is executed by the data transfer unit 304. Furthermore, in cycle (10), an instruction for storing the data in the memory 210 is output from the operation control unit 310 to the operation unit 312. However, the memory 210 is stalled, and therefore the operation unit 312 writes the data in the output side temporary storage unit 308.

In cycle (11), an instruction to execute an operation is issued from the operation sequencer 316.

In cycle (11), according to control by the operation control unit 310, an operation is executed by the operation unit 312, by using the data loaded in cycle (9). Furthermore, according to control by the transfer control unit 302, the data transfer unit 304 transfers, to the memory 210, the data written in the output side temporary storage unit 308. The data transfer unit 304 outputs the data written in the output side temporary storage unit 308 by a FIFO method.

In cycle (12), an instruction to execute the loading of the data is issued from the transfer sequencer 314. In cycle (12), according to control by the transfer control unit 302, the loading of the data is executed by the data transfer unit 304. In cycle (12), an instruction for executing an operation is issued from the operation sequencer 316. In cycle (12), according to control by the operation control unit 310, an operation is executed by the operation unit 312, by using the data loaded in cycle (10).

In cycle (13), an instruction to execute an operation is issued from the operation sequencer 316. In cycle (13), according to control by the operation control unit 310, an operation is executed by the operation unit 312, by using the data loaded in cycle (12).

In cycle (3), instead of outputting the data (operation result) written in the output side temporary storage unit 308 by the data transfer unit 304 by the FIFO method, paths to which the data is supplied may be identified. By identifying the paths to which the data is supplied, even in a case where a plurality of types of data are transferred, it is possible to identify the data. By identifying the data, it is possible to supply the data in the order in which the transfer instructions are issued.

By identifying the paths to which the data is supplied, even in a case where the operation unit 312 has executed the operation process a plurality of times, it is possible to identify the operation results. By identifying the operation results, it is possible to acquire the operation results according to the operation process.

For example, when the operation results need to be identified because there are a plurality of operation results obtained by operation processes according to the operation instructions, the same number of output side temporary storage units as the number of operation results, may be prepared.

Figure 8:
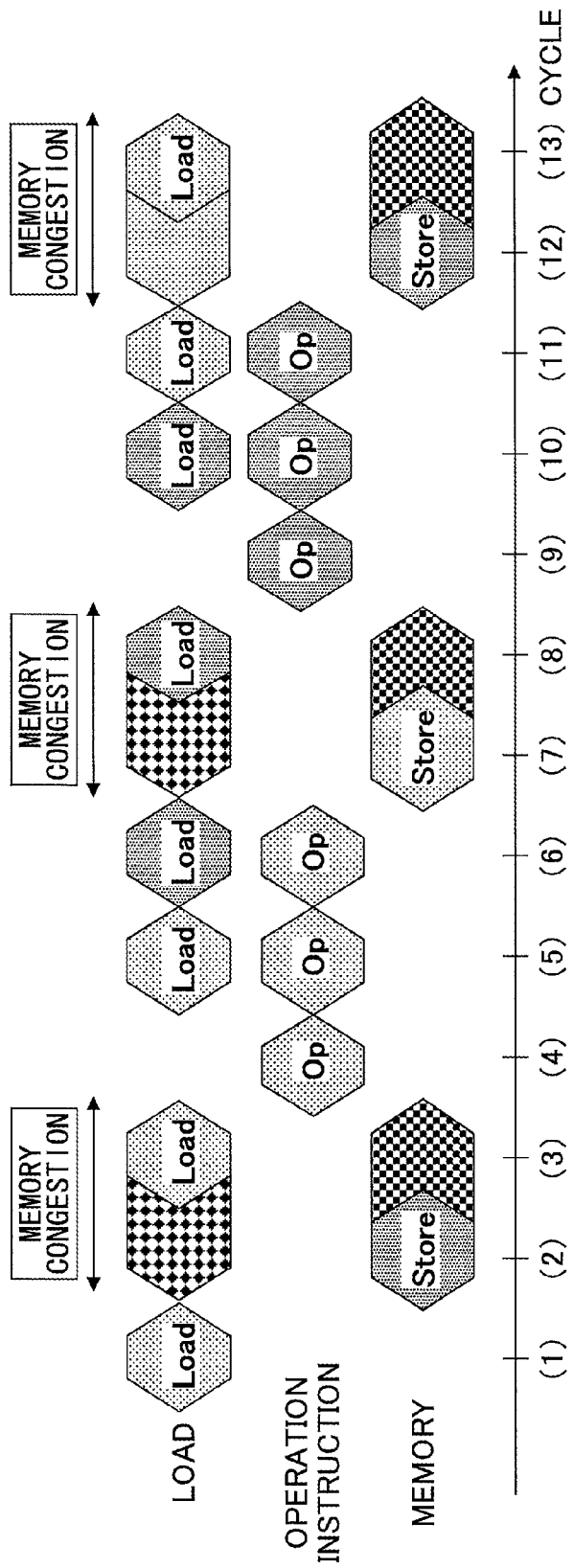
FIG. 8 illustrates a process according to the conventional configuration.

FIG. 8 illustrates a process according to the conventional configuration. In FIG. 8, the horizontal axis indicates the time. For example, the horizontal axis indicates the "cycle". In FIG. 8, the cycles are denoted by (1) through (13).

In cycle (1), the loading of the data is executed.

In cycle (2), an attempt is made to load data. However, because the memory is storing data, the loading of data is not executed. The loading of data is not executed because there is one access port to the memory, and it is not possible to simultaneously perform loading and storing. In the time chart illustrated in FIG. 7, the stalling is avoided by the output side temporary storage unit 308.

In cycle (3), the loading of the data, which was supposed to be loaded in cycle (2), is executed. In the memory, the data stored in cycle (2) is held.

In cycle (4), an operation is executed, by using the data loaded in cycle (1).

In cycle (5), the loading of the data is executed. In cycle (5), the operation is executed by using the data loaded in cycle (3).

In cycle (6), the loading of the data is executed. In cycle (6), the operation is executed by using the data loaded in cycle (5).

In cycle (7), an attempt is made to load data. However, because the memory is storing data, the loading of data is not executed. The loading of data is not executed because there is one access port to the memory, and it is not possible to simultaneously perform loading and storing.

In cycle (8), the loading of the data, which was supposed to be loaded in cycle (7), is executed. In the memory, the data stored in cycle (7) is held.

In cycle (9), an operation is executed, by using the data loaded in cycle (6).

In cycle (10), the loading of the data is executed. In cycle (10), the operation is executed by using the data loaded in cycle (8).

In cycle (11), the loading of the data is executed. In cycle (11), the operation is executed by using the data loaded in cycle (10).

In cycle (12), an attempt is made to load data. However, because the memory is storing data, the loading of data is not executed. The loading of data is not executed because there is one access port to the memory, and it is not possible to simultaneously perform loading and storing.

In cycle (13), the loading of the data, which was supposed to be loaded in cycle (12), is executed. In the memory, the data stored in cycle (12) is held.

In the time chart of FIG. 8, a congestion is occurring in the memory at cycles (2), (7), and (12), and therefore the operation efficiency is decreased.

Operations of Signal Processing Device

FIGS. 9 and 10 are flowcharts indicating operations of the signal processing device according to an embodiment.

FIG. 9 mainly illustrates a process executed by the data transfer unit 304 according to control by the transfer control unit 302.

FIG. 10 mainly illustrates a process executed by the operation unit 312 according to control by the operation control unit 310.

A description is given of a process executed by the data transfer unit 304 according to control by the transfer control unit 302, with reference to FIG. 9.

In step S902, the data transfer unit 304 is activated. For example, the power of the data transfer unit 304 may be turned on as the power of the mobile terminal 100 is turned on.

In step S904, the transfer control unit 302 determines whether there is data to be transferred.

When there is data to be transferred, in step S906, the transfer control unit 302 determines whether there is free space in the input side temporary storage unit 306. For example, the transfer control unit 302 determines whether there is free space corresponding to the data determined as being present in step S904, in the input side temporary storage unit 306.

In step S908, the transfer control unit 302 controls the data transfer unit 304, to transfer the data from the memory 210 to the input side temporary storage unit 306.

When there is no data to be transferred in step S904, the processes of steps S906 and S908 are not executed. When there is no free space in the input side temporary storage unit 306 in step S906, the process of step S908 is not executed.

In step S910, the transfer control unit 302 determines whether there is data to be transferred in the output side temporary storage unit 308.

In step S912, when there is data to be transferred, the transfer control unit 302 controls the data transfer unit 304 to transfer the data from the output side temporary storage unit 308 to the memory 210.

When there is no data to be transferred in step S910, the process of step S912 is not executed.

In step S914, the transfer control unit 302 determines whether the data transfer process has ended. When the data transfer process has ended, the transfer control unit 302 ends the process. When the data transfer process has not ended, the transfer control unit 302 executes the process from step S904.

In the flowchart illustrated in FIG. 9, the processes of steps S904 through S908 and the processes of steps S910 through S912 may be interchanged.

A description is given of a process executed by the operation unit 312 according to control by the operation control unit 310, with reference to FIG. 10.

In step S1002, the operation unit 312 is activated. For example, the power of the operation unit 312 may be turned on as the power of the mobile terminal 100 is turned on.

In step S1004, the operation control unit 310 determines whether there is unprocessed data in the input side temporary storage unit 306.

When there is unprocessed data, in step S1006, the operation control unit 310 controls the operation unit 312 to read data from the input side temporary storage unit 306, and execute an operation process.

In step S1008, the operation control unit 310 determines whether there is free space in the output side temporary storage unit 308. For example, the operation control unit 310 determines whether there is free space corresponding to the data that has undergone the operation process in step S1006, in the output side temporary storage unit 308.

In step S1010, the operation control unit 310 controls the operation unit 312, to transfer data to the output side temporary storage unit 308.

In step S1004, when there is no unprocessed data, the determination of step S1004 is performed again. In step S1008, when there is no free space in the output side temporary storage unit 308, the determination of step S1008 is performed again.

In step S1012, the operation control unit 310 determines whether the operation process has ended. When the operation process has ended, the operation control unit 310 ends the process. When the operation process has not ended, the operation control unit 310 executes the process from step S1004.

Effects of Present Embodiment

Figure 11B:
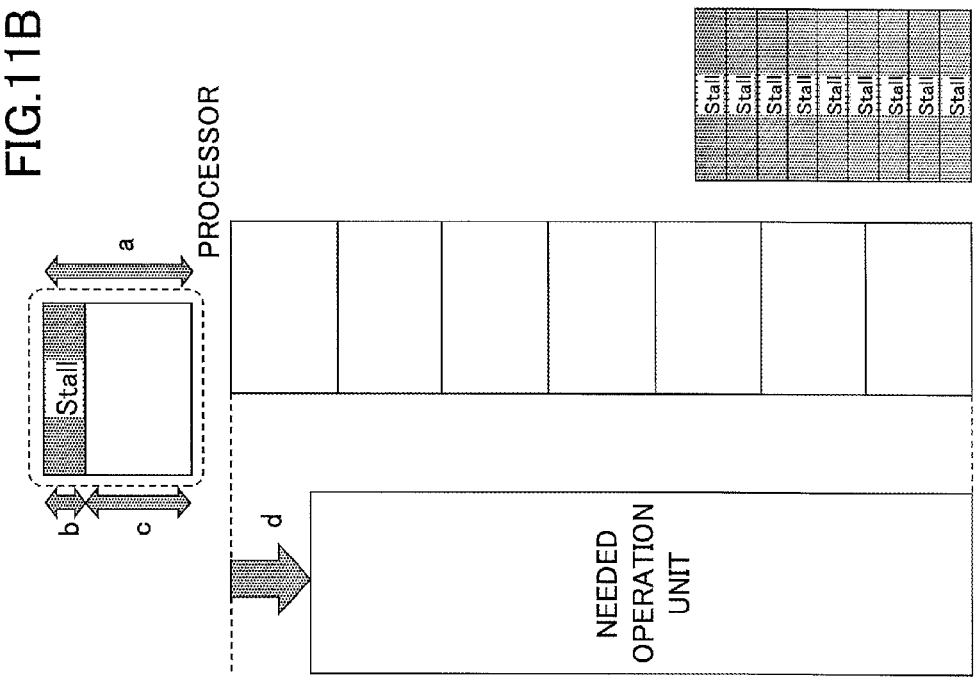
FIGS. 11A and 11B are for describing the effects of the signal processing device according to an embodiment.
Figure 11A:
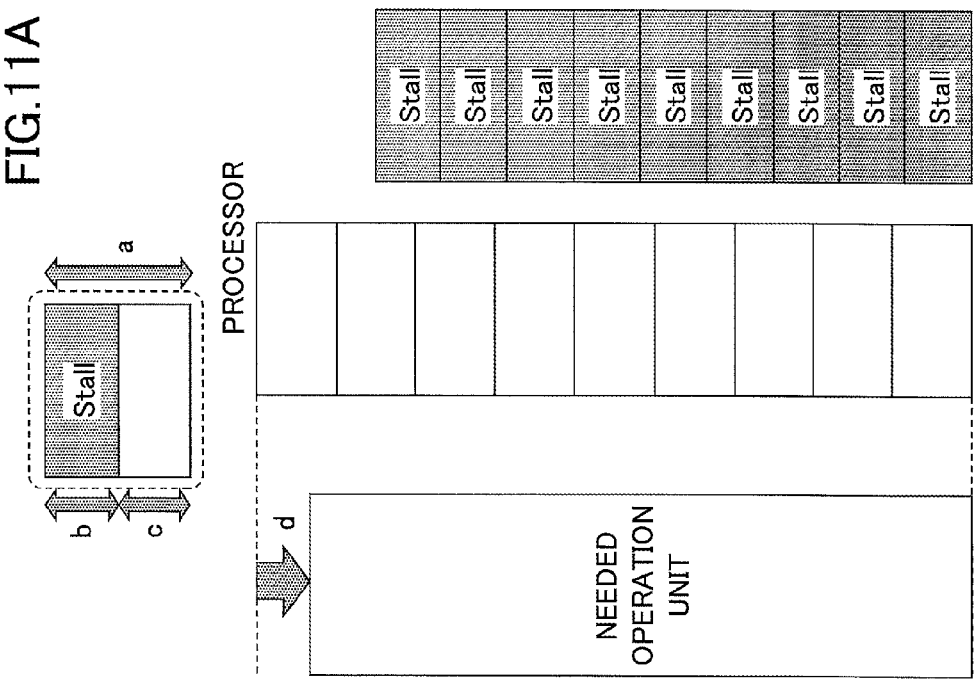

FIGS. 11A and 11B are for describing the effects of the signal processing device according to an embodiment.

FIG. 11A illustrates a process by the conventional signal processing device, and FIG. 11B illustrates a process by the signal processing device according to the present embodiment.

In FIGS. 11A and 11B, "a" expresses the entire processing capacity of the processor; "b" expresses the capacity that is lost due to a stall; and "c" and "d" express the effective capacity that may be used when executing a process.

The number of processors for processing the needed operation amount is obtained by dividing the needed operation amount by the processing capacity expressed by "c".

In the conventional signal processing device, in the entire processing capacity of the processor, the ratio of the capacity lost due to a stall is large. As a result, in the conventional signal processing device, the number of needed processors increases.

In the signal processing device according to the present embodiment, in the entire processing capacity of the processor, the ratio of the capacity lost due to a stall is small, compared to the conventional signal processing device. As a result, in the signal processing device according to the present embodiment, the number of needed processors may be decreased. Because the number of needed processors may be decreased, it is possible to reduce the circuit scale for realizing the target process.

Modification Example

Figure 12:
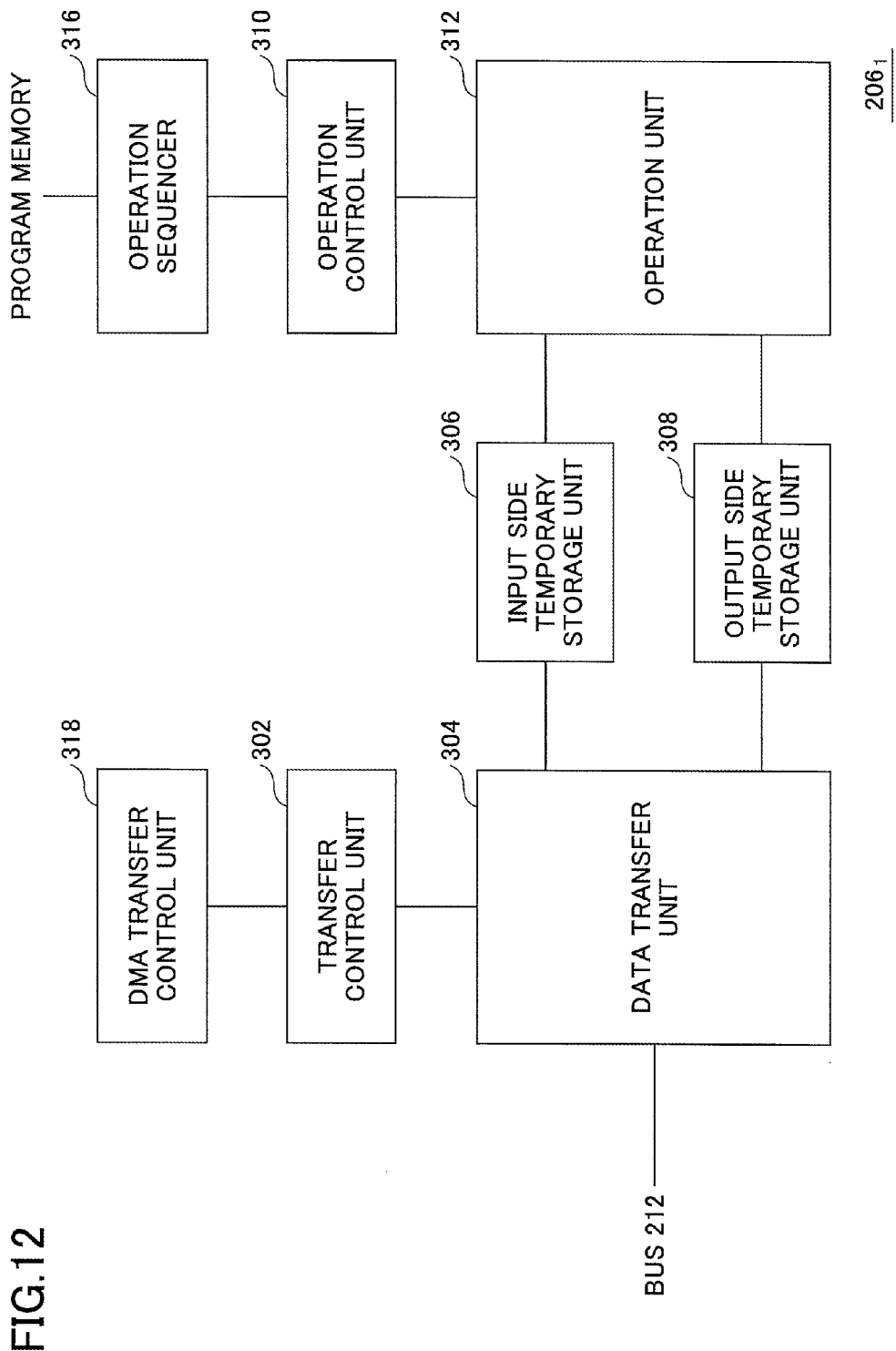
FIG. 12 illustrates a modification example of functions of the signal processing device.

FIG. 12 illustrates a modification example of functions of the signal processing device.

The signal processing device according to the modification example is different from the signal processing device described with reference to FIG. 5 in that a DMA (Direct Memory Access) transfer control unit 318 is included, instead of the transfer sequencer 314. The DMA transfer control unit 318 has substantially the same functions as the transfer control unit 302. The DMA transfer control unit 318 may be configured to include a DMA transfer control unit for loading and a DMA transfer control unit for storing. The DMA transfer control unit 318 performs a process of transferring data, without depending on an instruction stored in the program memory. For example, the DMA transfer control unit 318 sets the transfer contents. The transfer contents include information expressing the address where the data is present, and information expressing the sizes of the data to be transferred. The DMA transfer control unit 318 is different in terms of being activated according to settings by the operation sequencer 316. In this case, the DMA transfer control unit 318 may be activated by executing an operation instruction from the operation sequencer 316. Furthermore, the DMA transfer control unit 318 may be activated according to control signals from a control processor or a control circuit of a function block level of a higher layer.

By including the DMA transfer control unit 318, an instruction to access the memory is directly issued to the transfer control unit 302 after being activated according to settings by the operation sequencer 316, and therefore the processing speed is increased.

The signal processing device according to the embodiment and the modification example is particularly effective by being applied to a communication method for executing a large amount of relatively simple operations as typified by OFDM. OFDM is a method of frequency multiplexing, in which the carriers are arranged so as to be orthogonal to each other, so that the density of the carrier frequency is increased and the frequency efficiency is enhanced. OFDM is used in LTE, WiMAX, and digital terrestrial broadcasting. In this communication method, the order of the data to be transferred is clearly known in advance, and therefore it is possible to execute instructions in parallel while reducing the impact between data. That is to say, by dividing the control of transferring data used for operations and the control of performing the actual operations, it is possible to reduce the impact of the stall occurring in the data transfer, on the operation process. Therefore, the operation unit is efficiently operated.

According to an aspect of the embodiments, a signal processing device is provided, which is capable of separately controlling a load instruction and an operation instruction.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A signal processing device which operates based on Very Long Instruction Word (VLIW) instructions, comprising:
    an operation control unit configured to control, in response to an operation instruction extracted from the VLIW instructions, a timing of an operation process executed by an operation unit;
    a storage unit configured to store data that is a target of the operation process; and
    a transfer control unit configured to control, in response to a transfer instruction extracted from the VLIW instructions, a timing of reading from a memory and transferring to the storage unit the data that is the target of the operation process, such that the data that is the target of the operation process is loaded by the operation unit according to the timing of the operation process controlled by the operation control unit; and
    wherein utilizing the storage unit so that the timing control by the operation control unit responsive to the operation instruction extracted from the VLIW instructions is performed separately from the timing control by the transfer control unit responsive to the transfer instruction extracted from the VLIW instructions.

2. The signal processing device according to claim 1, wherein
    the transfer control unit controls the timing of reading and transferring the data that is the target of the operation process, in response to the transfer instruction extracted from the VLIW instructions stored in a program memory.

3. The signal processing device according to claim 1, wherein
    the transfer control unit controls the timing of reading and transferring the data that is the target of the operation process, according to a DMA (Direct Memory Access) method.

4. The signal processing device according to claim 1, wherein
    the transfer control unit controls the timing of reading and transferring a plurality of data items that are the targets of the operation process, according to a FIFO (First-In First-Out) method.

5. The signal processing device according to claim 1, wherein the storage unit comprises a plurality of storage units, and the transfer control unit controls the timing of transferring a plurality of data items that are the targets of the operation process, when transferring the plurality of data items that are the targets of the operation process to the storage units.

6. A signal processing method which operates based on Very Long Instruction Word (VLIW) instructions, comprising:
    controlling, in response to an operation instruction extracted from the VLIW instructions, a timing of an operation process executed by an operation unit;
    controlling, in response to a transfer instruction extracted from the VLIW instructions, a timing of reading from a memory and transferring to a storage unit data that is a target of the operation process, such that the data that is the target of the operation process is loaded by the operation unit according to the timing of the operation process; and
    wherein utilizing the storage unit so that the timing control responsive to the operation instruction extracted from the VLIW instructions is performed separately from the timing control responsive to the transfer instruction extracted from the VLIW instructions.

7. The signal processing device according to claim 1, wherein
    the timing controlled by the operation control unit and the timing controlled by the transfer control unit are in synchronization with each other.

8. The signal processing device according to claim 1, wherein
    the operation control unit controls the timing of the operation process in response to an operation instruction extracted from the VLIW instructions stored in a program memory.

9. The signal processing device according to claim 1, wherein
    the operation control unit controls the timing of transferring the data that has undergone the operation process executed by the operation unit.

10. The signal processing device according to claim 9, wherein
    the operation control unit controls the timing of transferring the data that has undergone the operation process, according to a FIFO (First-In First-Out) method.

11. The signal processing device according to claim 9, further comprising:
  one or more storage units configured to store the data that is transferred according to the timing controlled by the operation control unit, wherein
  the operation control unit controls the timing of transferring a plurality of data items that have undergone the operation process, when transferring the plurality of data items that have undergone the operation process to the one or more storage units.

12. A mobile terminal comprising:
the signal processing device according to claim 1.

* * * * *